Aug. 13, 1929.   J. H. BARNES   1,724,169
BEVEL GEAR CUTTING MACHINERY
Original Filed March 9, 1925   3 Sheets-Sheet 1

Inventor
James H. Barnes
By Edward T. Noi Jr.
Attorney

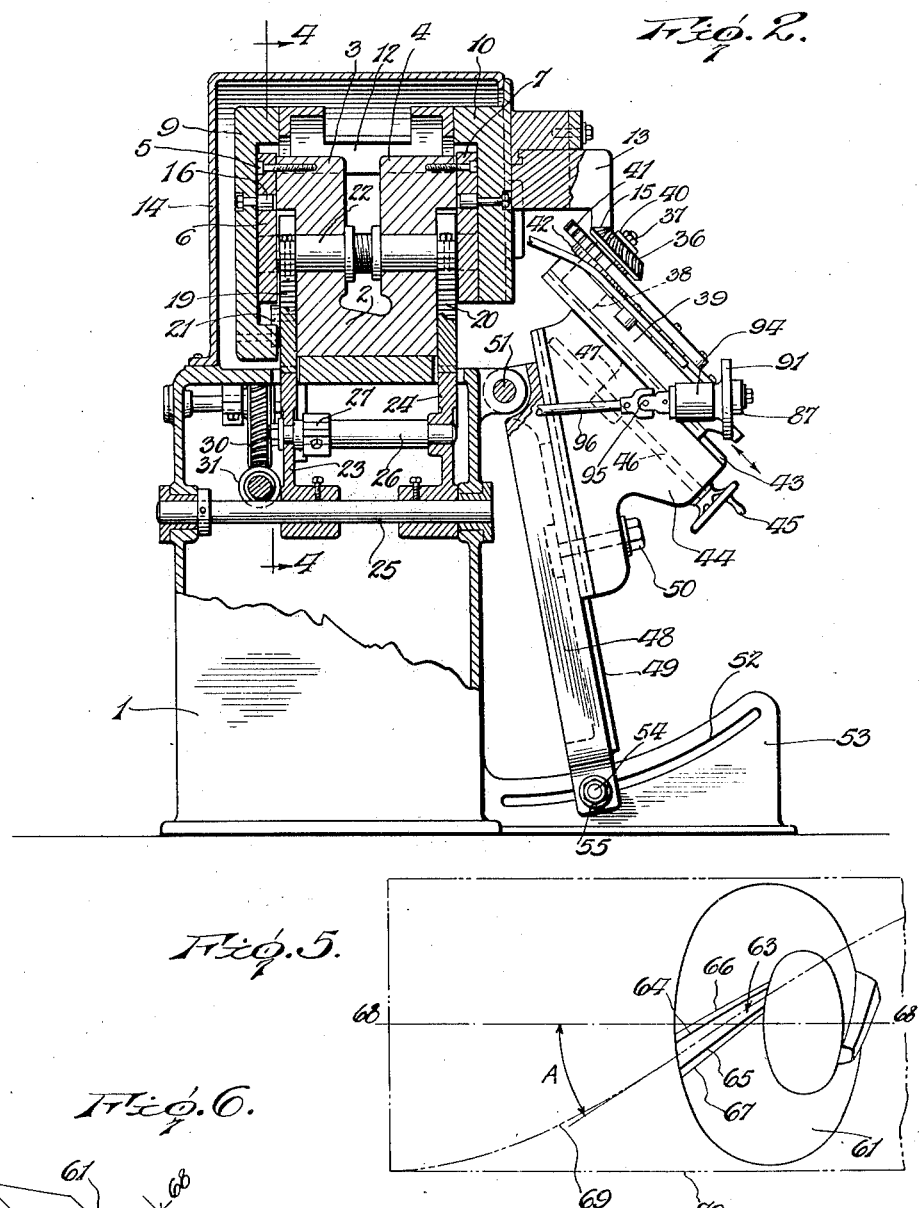

Aug. 13, 1929.   J. H. BARNES   1,724,169
BEVEL GEAR CUTTING MACHINERY
Original Filed March 9, 1925   3 Sheets-Sheet 3

Inventor
James H. Barnes
By Edward J. Noé Jr.
Attorney

Patented Aug. 13, 1929.

1,724,169

UNITED STATES PATENT OFFICE.

JAMES H. BARNES, OF DAYTON, OHIO, ASSIGNOR TO DAYTON CURVOMETER PRODUCTS COMPANY, OF DAYTON, OHIO, A CORPORATION OF OHIO.

BEVEL-GEAR-CUTTING MACHINERY.

Application filed March 9, 1925, Serial No. 14,150. Renewed February 23, 1929.

This invention relates to bevel gear cutting machinery and a primary object is a provision of a machine of this character which will enable the cutting of gear teeth surfaces by shaves taken inwardly toward the root of the tooth in the manner as set forth in my prior application, art of gear cutting, Serial No. 745,414, filed October 23, 1924, upon which this invention is an improvement.

In the invention to be more fully set forth hereafter, a movable tool holder is adapted to oscillate back and forth in order to cut the roughed gear blank, so that each cut is taken in the direction of roll of the working surface of the tooth, or in other words in the direction of the involute, in case involute teeth are being cut. The gear is mounted in fixed position while being cut, with the axis of the gear angularly related to the line about which the tool holder moves and oscillates, so that bevel gears may be cut. A main table is supported so that it may be angularly adjusted in order to properly adjust the angle of the axis of the gear blank to be cut and auxiliary tables are mounted upon the main angle adjusting table so that the gear cut may be moved bodily to properly position it in relation to the tool holder.

Another feature of novelty resides in the manner in which the tool holder is mounted upon a fixed support by means of the cam slots and the rollers operating therein, so that the tool holder is guided both vertically and laterally by means of the cam slots and rollers. A roller is positioned so that it is in line with the force exerted upon the edge of the tool at all times. The distance from this upper guide roller to the center of the base circle, about which involute gears may be generated, is properly positioned so that the cam slot for this roller is as flat as possible, thus enabling the slot to be easily machined.

A further object of the invention is the provision of means by which bevel gears may be cut with working surfaces of practically or exactly involute shape, these involutes being described about a base cylinder, the radius of which is equal to the distance between the theoretical base cone and the axis of the cone, taken along a line perpendicular to the base cone surface between the inner and outer limits of the tooth length. The exact radius of the base cylinder is so designed that a minimum of wear takes place, and at the same time so that a maximum extent of the tooth surface is effective in the transmission of force.

The working surfaces of the bevel gear teeth are all cut about the same base cylinder, the cutting edge of the tool being slightly offset from the true radial line from the center of the gear so that the inner ends of the teeth are slightly reduced in size, and so that the outer ends of the teeth are of the same size or slightly increased in size from the theoretically perfect tooth with all lines in the working surfaces extending radially from the generating point in the axis of the gear.

The invention also sets forth a novel indexing mechanism, with provisions for automatically indexing the gear blank between cuts. This indexing mechanism operates so as to minimize and practically obviate any errors due to lost motion in the parts of the system.

Further objects and advantages of my invention will be more fully set forth in the attached specification, in the claims and in the drawings, in which Fig. 1 is a front elevation of a bevel gear cutting machine provided with a tool for cutting spiral bevel gears.

Fig. 2 is a vertical section taken on the line 2—2 of Fig. 1.

Fig. 5 is a view looking directly at a spiral tooth, showing the construction of the base cone and the helix angle.

Fig. 6 is a section of two mating bevel gears, one of which corresponds to the showing in Fig. 5.

Figure 1:
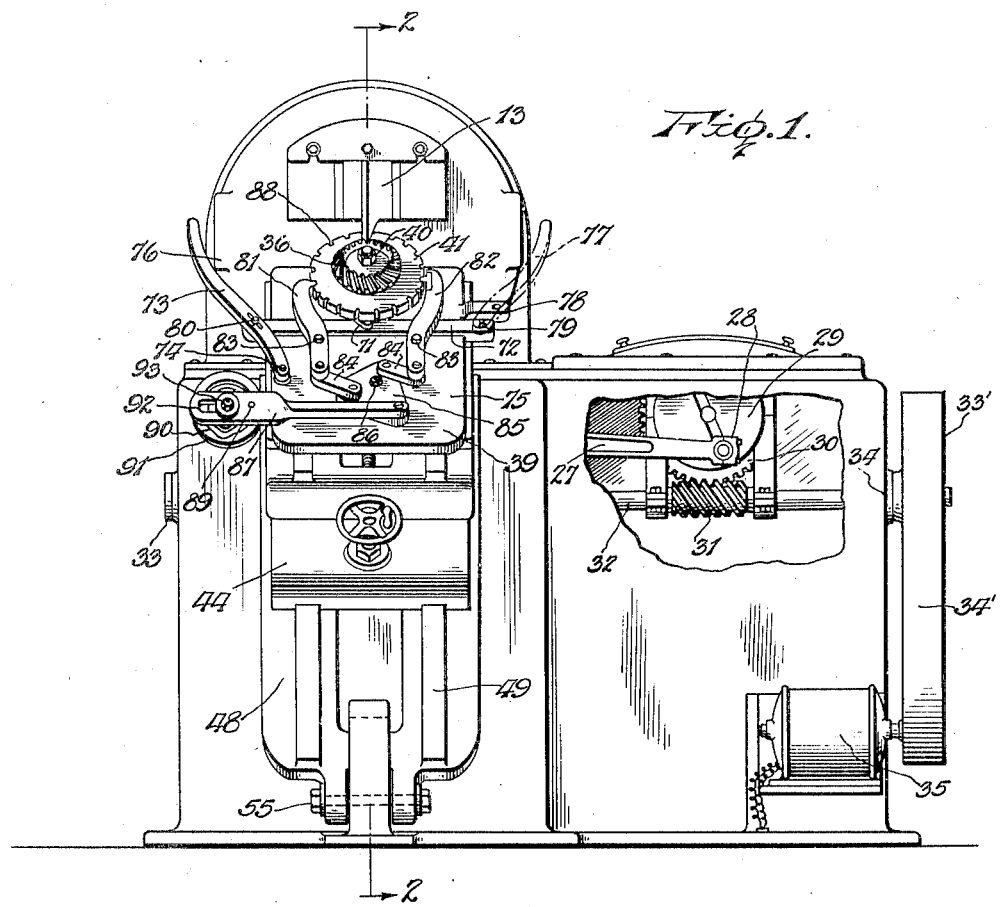

Referring to the drawings more particularly by reference numerals, 1 represents a main base supporting casting upon which is mounted an upper support block 2 provided with two upwardly extending supporting arms 3 and 4. These arms have attached thereto by means of the bolts or screws 5, two cam plates 6 and 7, which are provided with suitable cam slots for guiding the movements of a tool holder. Within each cam slot is movably mounted a roller 8, the shaft of which extends into and is fixed within one of the end plates 9 and 10 of the tool holder. These end plates are bolted together by means of bolts or screws 11, which attach the end plates to an intermediate, part cylindrical, spacing member 12. The end plates and spacing member together constitute a movable tool holder upon which is adjustably mounted the tool 13 by means of suitable adjusting screws and blocks so that the tool may be properly positioned on the end of the tool holder.

The main supporting casting has mounted thereon the case or shell 14 extending around the tool holder so as to shield and protect the same.

Figure 4:
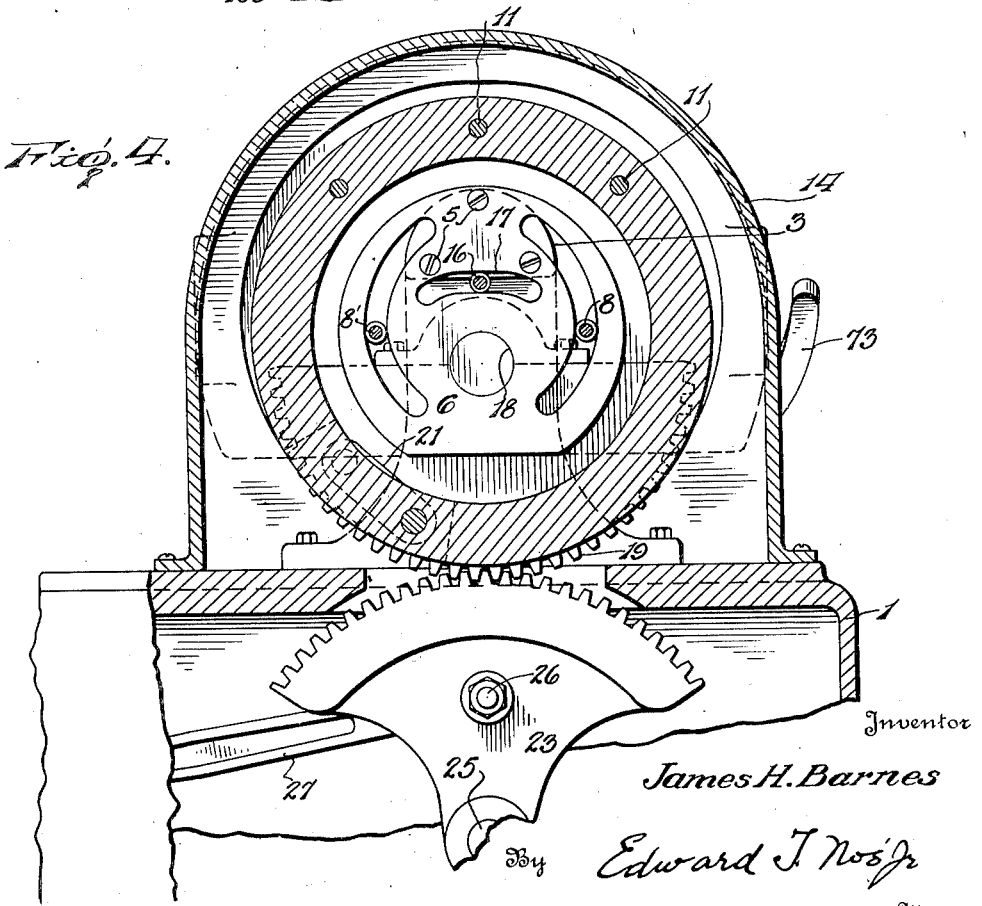
Fig. 4 is a vertical section on the line 4—4 of Fig. 2, taken through one cam plate.

The edge of the tool 15, which is practically a straight line, is adapted to move so that each point in this line describes either exactly or approximately an involute line in space and for this reason the entire holder is mounted so that it, in effect, practically oscillates in conjunctive relation to an imaginary base surface of cylindrical or modified cylindrical form. Such a movement of the tool holder is made possible by the provision of two side rollers 8 and 8' which operate within the two side guide slots in the cam plate, which guide the tool holder in a horizontal sense so as to limit the movements of the tool holder in a horizontal direction. Co-operating with these two rollers 8 and 8' is a top roller 16 operating within the top guide slot 17 of the cam plate. This roller 16 operates to restrain the vertical movements of the tool holder and together with the side rollers 8 and 8' completely governs the movements of the tool holder in space. It will be understood, of course, that a cam plate and rollers are provided at each end of the tool holder. When an involute surface is to be cut upon the working surface of the bevel gear blank, the two side cam slots are of involute form, and the rollers 8 and 8' are preferably so positioned that their centers lie on the plane which operates in conjunctive relation to the imaginary base surface indicated at 18, Fig. 4. The distance of the cam roller 16 from the center of the base surface 18 may be any suitable amount, this distance governing the shape of the cam slot, in which it operates. It is preferred to so position the roller 16 from the base surface 18 that the cam slot 17 will be as flat as possible at its intermediate portions, thus enabling the cam slot to be easily machined. It is also preferred to position the roller 16 directly above the base cylinder and therefore directly above the line of the cutting edge of the tool so that the force exerted in resisting the operation of the tool will be directly through this roller.

The shape of the cam slots may be varied to as great a degree as is desired from that required to cut a true involute surface, and if desired only one side slot may be used to govern the lateral or horizontal position of the tool holder. The tool holder is adapted to be oscillated back and forth by means of the oscillating segments 19 and 20 which are pivotally connected to the tool holder end plates 9 and 10 by means of the links 21. These gear segments 19 and 20 are oscillatably mounted at their upper ends upon a spindle 22, which is fixed in position within the supporting arms 3 and 4. The segmental links 19 and 20 are driven by two drive segments 23 and 24, which are fixed on a jack shaft 25 journaled in the front and rear walls of the supporting casting 1. The two drive segments are attached together by a rod 26 which is driven by a crank 27, one end of which is adjustably attached as at 28 to a drive disk 29 so that the distance between point 28 and the center of the disk may be varied. Disk 29 is attached to and rotated by a worm wheel 30 which is driven by a worm 31 on shaft 32 which is journaled at 33 and 34 in the ends of the main base casting 1. Shaft 32 projects beyond the end of the casting 1 and is provided with a fly wheel 33' which is driven by means of a belt 34' from a motor 35. It will be seen therefore that the tool holder is oscillated back and forth so that the line 15 of the tool generates an involute surface in space when the line 15 lies in a plane which rocks in conjunctive relation about a base cylinder when involute surfaces are to be cut on the bevel gears. Suitable start and stop mechanism is provided which may take any desired form.

The roughed gear blank is shown at 36 in Fig. 2, being clamped to a shaft 37 which is provided with an enlarged lower end 38 in rotatable bearing relation with the upper table 39. A suitable nut 40 is threaded on the end of this shaft 37 and rigidly holds the gear blank 36 against the index plate 41. Beneath the index plate 41 is a ratchet plate 42, it being understood that the shaft 37 with its bearing extension 38 rigidly support the plates 41 and 42 and the roughed gear blank thereon. The nut 40 serves to hold all of these members rigidly together, but to permit the substitution of one or the other plates or the removal of the gear blank.

The upper table 39 provides a seat for the lower bearing end 38 of the gear supporting spindle 37 and is slidingly mounted so as to be moved in the direction of the arrow shown in Fig. 2. Slides 43 are provided on an auxiliary table 44, the position of the table 39 on the auxiliary table 44 being determined by the hand wheel 45 which turns a threaded shaft 46 engaging with a lug 47 rigid with the table 39. The auxiliary table 44 is adapted to be moved along the main angle adjusting table 48 which is provided with slides 49 for this purpose. Suitable locking mechanism such as the bolts 50 rigidly hold the auxiliary table 44 in position on the main angle adjusting table 48. The main table 48 is pivotally supported on an axis 51 along the front face of the main base supporting casting 1. Suitable locking mechanism is provided at the lower end of the table 48 so that the angle of the table 48 may be adjusted and securely locked in position. For this purpose the arcuate slot 52 is provided on a base extension 53, the arc of the slot 52 having a center at 51. A pin 54 operates within the slot 52 and one end of this pin is provided with a nut 55 to rigidly fasten the table in position. These three tables permit the roughed gear blank to be exactly positioned in space so that it is proper relation to the cutting tool edge and so that the angle of the roughed gear blank axis is so located that the upper surface line of the theoretical base cone is horizontally positioned.

Figure 7:
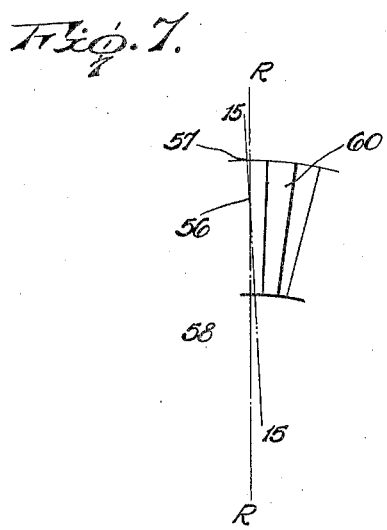
Fig. 7 is a diagrammatical view of a straight bevel gear tooth, looking directly at the tooth.
Figure 8:
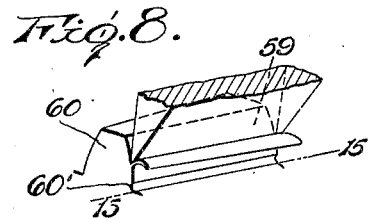
Fig. 8 is a perspective view of the tooth shown in Fig. 7.
Figure 3:
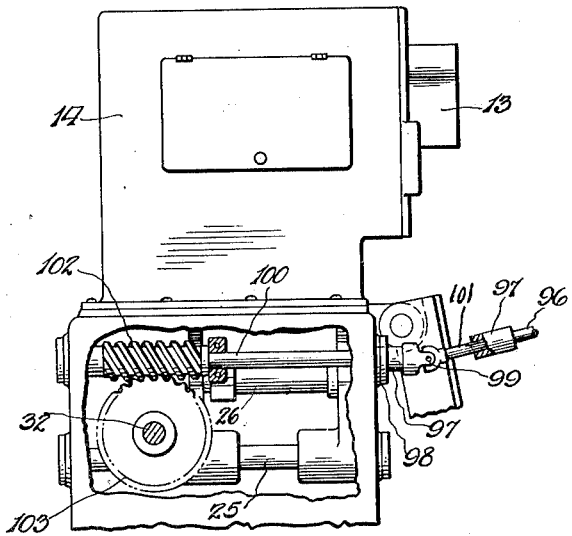
Fig. 3 is a front partial view of the tool holder and the supporting casting therefor, showing the latter broken away to reveal the indexing mechanism.

Referring now to Figs. 7 and 8, when a straight bevel gear tooth is to be cut the line of the tool cutting edge 15 corresponds to the line 15—15 of Fig. 7. This line 15—15 is at a slight angle to the true radial line R—R, the line 15—15 being offset angularly about a point 56 which is located between the inner and outer limits of the tooth length. The exact position of this point 56 depends upon the shape to be given to the working surfaces of the tooth and also depends to a large extent upon the character of material used and the number of teeth on the gear, as well as the purpose for which the gears are to be used. The point 56 is preferably located between the outer limits of the tooth and the center of the tooth, such a location resulting in a very slight increase in the size of the tooth at the outer portions thereof, as indicated at 57, and a slight decrease in the theoretical size of the tooth at the inner portions of the tooth as at 58. Since the working surface 59 of the tooth 60 shown in Figs. 7 and 8, is substantially involute, described on a common base circle from end to end of the tooth, it is necessary to so offset the angle of the line 15—15 as described, in order for the final tooth shape to be approximately correct at its inner portions of the addendum. In order to permit a single continuous shave to be made to finish each tooth working surface, the roughed gear blank is made with undercuts as indicated at 60' at the roots of the teeth so that the shaving will be finished and fall off when the tool edge reaches the deepest part of the undercut at the base surface of the finished gear.

Instead of constructing the cam slots so that the working surfaces are substantially involutes, modified involutes may be cut by modifying the shape of the cam slots; and the edge 15 of the tool instead of being positioned horizontal, may have one end thereof lower than the other so that the final tooth form may more closely approximate the theoretical. The radius of the base surface about which the involutes are generated corresponds to the distance between the point 56 on the base cone of the gear and the axis of the base cone, this distance being taken perpendicular to the radial line on the surface of the base cone and corresponding to the distance 56—56', in Fig. 6. Spiral bevel gears may be cut as well as the straight bevel gears shown in Figs. 7 and 8, the only change necessary being in the angle which the edge 15 of the tool makes with the transverse plane corresponding to the end of the tool holder. In Fig. 5, the base cone 61 of the gear 62 of Fig. 6 is shown looking in a direction perpendicular to the center of the tooth 63. Lines 64 and 65 represent the top or tip portions of the tooth and lines 66 and 67 represent the spiral lines on the base cone 61, corresponding to the root of the tooth. The angle of the spiral is the angle A between the tangent line at the center of the tooth on the base cone and the axial line 68—68. The helix 69 drawn about the base cylinder 70 having a radius equal to 56—56', of Fig. 6 has the same angle as the angle A of the spiral on the base cone of the spiral gear. The edge 15 of the tool is therefore set at an angle to the radial surface line of the base cone which corresponds to the angle of the helix 69, but modified by the slight offset angle corresponding to the angle between lines 15—15 and R—R as in Fig. 7.

In order to index the gear blank between cuts the following indexing mechanism is provided. The gear blank together with the index plate 41 and the ratchet plate 42 are rotated step by step by a pawl 71 on a slide bar 72 which is operated back and forth automatically as the tool holder oscillates, by means of an arm 73 pivoted at 74 on the face 75 of the table or carriage 39. Arm 73 is moved by a lug 76 provided on the side of the tool holder as shown, a suitable spring, not shown, operating to return the slide 72 to its normal position. Arm 73 operates to index the gear a step at a time, as one side of the successive teeth of the gear are cut. When cutting the other sides of the teeth of the gear a second tool with its cutting edge facing opposite to the tool 13 is used, and an arm is inserted at 77 as shown in dotted lines so as to be pivoted about the fixed point 78 and pivotally connected to the slides 72 and 79 by removable pins. When arm 77 is used so as to index the gear, arm 73 is removed by means of its removable pin 80. These two arms operate one at a time so as to index the gear during the same half of the cycle of movements of the tool holder in which the cut is made, so that the gear is stationary when the tool is traveling back over the finished surfaces of the gear teeth. The indexing takes place after the tool has moved back over the finished surface and before the tool has again reached the position to operate to finish a succeeding surface. After the gear and index plate have been moved a step by the pawl and the slide bar operating the same, the index plate and the gear rigid therewith are held and adjusted in the exact position for a cut by means of the locking dogs 81 and 82 which are pivoted on fixed axes 83 and operated by the links 84 pivoted to an oscillating plate 85. The oscillating plate 85 is moved about a fixed axis 86 by an arm or link 87 at the proper time in relation to the movement of the tool holder so that the locking dogs will engage in a series of indentations of V-shaped teeth 88 in the index plate. Suitable projections to exactly fit the indentations 88 are provided on the ends of the locking dogs. In this manner the index plate is exactly positioned, the angle of the projections on the locking dogs being sufficient to adjust the index plate any small amount necessary to compensate for the inaccuracies of the operation of the pawl, in case the pawl has operated the index plate through too small or too large an angle. Link or arm 87 is operated by means of a pin 89 projecting rearwardly from the arm 87 and operating in a cam groove 90 in the cam plate 91. A slot 92 in the link co-acts with a fixed pin 93 to provide for longitudinal adjustment only of the link 87. The cam plate 91 is rotated at an uniform speed in synchronism with the movements of the tool holder, this cam plate being mounted by means of a bearing 94 in a fixed position on the table 39. A universal driving connection 95 connects the cam plate 91 with the shafting 96, which is connected to the stub shaft 101, by means of a spline connection. Bearing 98 supports one end of shaft 100, and shaft 101 connects with the shaft 100 through a universal joint 99. The two universal joints and the sliding movements of the stub shafts at 97 permit the transmission of power from the operating shaft 100 to the cam plate 91, regardless of the position or the angles of the tables 39, 44 and 48. The spline connection at 97 connects the driving shaft 100 to the stub shaft 96. Shaft 100 is driven by a worm 102 which engages with the wormwheel 103 fixed on shaft 32. The wormwheel 103 is located near the left-hand end of the main supporting casting on the same shaft 32 which drives the worm gear 30 for moving the tool holder. The movements of the index cam plate 91 are therefore synchronized with the movements of the tool holder and the locking dogs are applied automatically to the index plate 41 at the proper time after the plate has been moved by the pawl so as to hold the plate and the gear blank in fixed position while being cut.

I am aware that various modifications and changes may be made in my invention and do not intend to be limited to the exact form which is shown herein for purposes of illustration.

I claim:

1. In a gear cutting machine for cutting gears, in combination, a support for holding a roughed gear blank stationary while being cut, means for indexing said gear between cuts, a movable tool holder and tool therefor and means for moving said tool holder back and forth to cause the tool to cut inwardly towards the root of the tooth to finish a working surface on a tooth of said gear, said last named means comprising a plurality of cam guides and rollers operating therewith for restraining the tool in a plurality of different senses to completely govern its movements.

2. In a gear cutting machine for cutting bevel gears, in combination, a support for holding a bevel gear while being cut, means for indexing said gear between cuts about an axis, a tool holder adapted to move relatively to said gear about an axis at an angle to said first named axis, a tool in said tool holder and means for moving said tool and tool holder relatively to said gear teeth so that the tool describes a path of varying curvature to cut a tooth of said gear from the end inwardly towards the root of the tooth.

3. In a gear cutting machine for cutting bevel gears, in combination, a support for holding a bevel gear stationary while being cut, means for indexing said gear between cuts about an axis, a movable tool holder adapted to move about an axis at an angle to said first named axis, a substantially straight edged tool in said tool holder and means for moving said tool holder so that a continuous shave is made on the tooth of said gear from the end inwardly to the root of the tooth.

4. In a gear cutting machine, in combination, a support for holding a roughed gear blank stationary while being cut, means for indexing said gear between cuts, a movable tool holder and tool carried by said tool holder, means for moving said tool holder so that the edge of said tool takes a shave on the tooth of said gear blank in the direction of roll of the tooth, said last named means comprising a roller fixed to said tool holder and a cam groove in which said roller operates for guiding the tool holder in relation to said support.

5. In a gear cutting machine, in combination, a support for holding a roughed gear blank stationary while being cut, means for indexing said gear between cuts, a movable tool holder and tool carried by said tool holder, means for moving said tool holder so that the edge of said tool takes a shave on the tooth of said gear blank in the direction of roll of the tooth, said last named means comprising a plurality of rollers fixed to said tool holder and a plurality of cam grooves within which said rollers operate, said rollers and cam grooves restraining the tool holder in a plurality of different directions to fully govern the movements of said tool holder.

6. In a gear cutting machine, in combination, a support for holding a roughed gear blank stationary while being cut, means for indexing said gear between cuts comprising an indexing plate located closely adjacent to and clamped to said gear blank, a movable tool holder, a tool therefor and means for moving said tool so that a continuous shave is made on a tooth of said blank substantially in the direction of roll of the surface cut thereon.

7. In a gear cutting machine for cutting bevel gears, in combination, a support for holding a bevel gear blank stationary while being cut, a movable tool holder and tool therefor, means for indexing said gear blank between cuts comprising an index plate positioned close to and clamped to said gear blank and aligned with the axis of said gear blank, said axis being angularly related to the axis of the tool holder, and means for moving said tool holder so that a shave is made on a tooth of said gear blank from the end inwardly towards the root of the tooth.

8. In a gear cutting machine for cutting bevel gears, in combination, a support for holding a bevel gear blank in fixed position while being cut, comprising an adjustable table and means for adjusting said table to properly position said gear blank, means for indexing said gear between cuts about an axis, a movable tool holder oscillatably mounted on said support, said tool holder having an axis adapted to move bodily as the tool holder is oscillated, said axis being angularly related to the axis of said gear blank, a tool held in said tool holder and means for moving said tool holder so that a shave is made on a tooth of said gear to cut a working surface on said tooth substantially in the direction of roll of said surface.

9. In a gear cutting machine for cutting bevel gears, in combination, a support for holding a bevel gear blank in fixed position while being cut, comprising a plurality of adjustable tables, means for pivotally adjusting one of said tables and means for sliding a second of said tables, one of said tables being supported upon the other so that said gear blank may be properly adjusted, means for indexing said gear blank between cuts about an axis, a movable tool holder oscillatably mounted on said support, said tool holder having an axis adapted to move bodily as the tool holder is oscillated, said axis being angularly related to the axis of said gear blank, a tool held in said tool holder and means for moving said tool holder so that a shave is made on a tooth of said gear to cut a working surface on said tooth substantially in the direction of roll of said surface.

10. In a gear cutting machine for cutting bevel gears, in combination, a support for holding a bevel gear while being cut, means for indexing said gear between cuts, a tool holder movable relatively to said gear, a tool therefor, said tool having a substantially straight edge at an angle to a radial surface line on the base cone when in contact with the base cone of said gear, the line of said tool intersecting said radial line on said base cone at a point between the outer end of the tooth and the central portion thereof, and means for relatively moving said tool and gear so that a continuous shave is made on the tooth of said gear from the end inwardly towards the root of the tooth.

11. In a gear cutting machine for cutting bevel gears, in combination, a support for holding a bevel gear blank stationary while being cut, means for indexing said gear between cuts comprising an index plate located close to and clamped to said gear blank, said support including a movably mounted table upon which said gear blank and index plate are mounted, means for adjusting said table to properly position said gear blank, locking dogs pivoted on said table, means for rotating said gear blank periodically, means for operating said locking dogs to cause them to engage said index plate periodically, a movable tool holder adapted to move about an axis at an angle to the axis of said gear blank, a tool held in said tool holder and means for moving said tool holder and said gear blank rotating means so that a shave is made on each tooth of said gear blank from the end inwardly towards the root of the tooth.

12. In a bevel gear cutting machine, in combination, a support for holding a spiral bevel gear while being cut, a tool holder movable relatively to said gear, a tool in said tool holder, said tool having a substantially straight cutting edge at an angle to a radial surface line on the base cone when in contact with the theoretical base cone of said gear, the edge of said tool intersecting said radial line on said base cone at an angle approximately equal to the spiral angle of the teeth of the spiral gear cut, and means for relatively moving said tool and gear so that a shave is made substantially in the direction of roll of the working surface cut on the gear.

13. In a bevel gear cutting machine, in combination, a support for holding a bevel gear while being cut, a tool holder movable relatively to said gear, a tool in said tool holder, said tool having a cutting edge at an angle to a radial surface line on the base cone when in contact with the theoretical base cone of said gear, means for relatively moving said tool holder and gear so that a shave is made substantially in the direction of roll of the working surface cut on the gear.

14. In a bevel gear cutting machine, in combination, a support, means on said support for holding a bevel gear stationary while being cut, a tool holder oscillatably mounted on said support, a tool in said tool holder having a cutting edge, means for oscillating said tool holder to cause each point in the edge of said tool to describe curves of approximate involute shape in space, the diameter of the base surface of said involutes being approximately equal to the distance between a radial surface line on the base cone of the gear and the axis of the gear, measured on a line perpendicular to the said radial surface line at a point between the outer end of the tooth and the middle portion thereof.

15. In a gear cutting machine, a support for a gear blank comprising a plurality of adjustable tables, means for pivotally adjusting one of said tables, and means for sliding a second of said tables, one of said tables being mounted on the other and the other being mounted on said frame, a cutting tool, and means for operating said tool.

In testimony whereof I have hereunto set my hand this 4th day of March, 1925.

JAMES H. BARNES.